M. DICKERSON.
AIR PURIFIER AND HUMIDIFIER.
APPLICATION FILED OCT. 29, 1915.

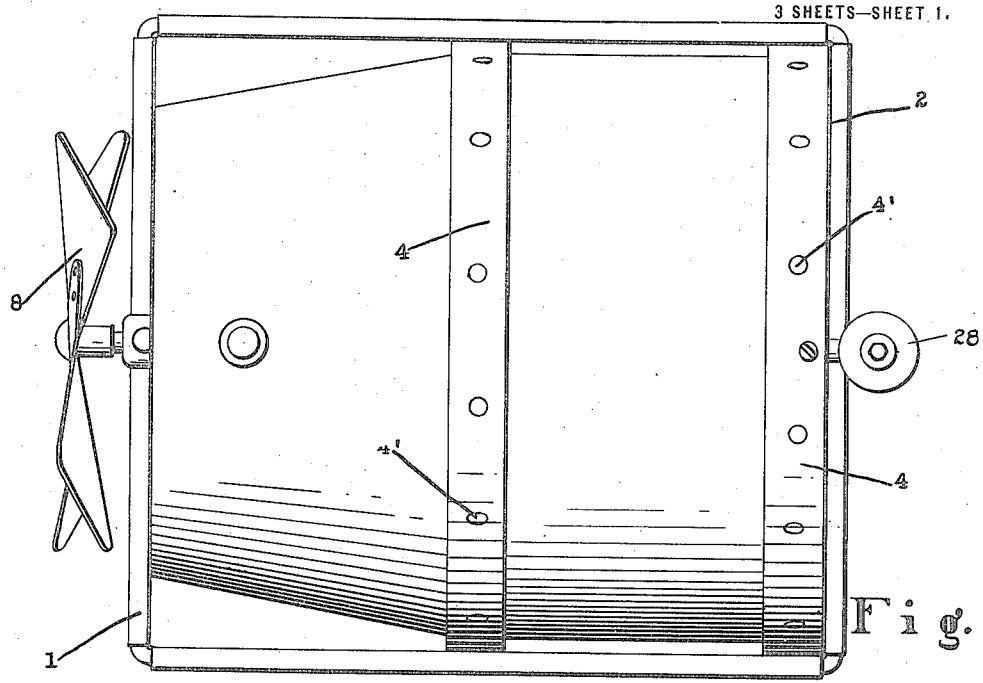
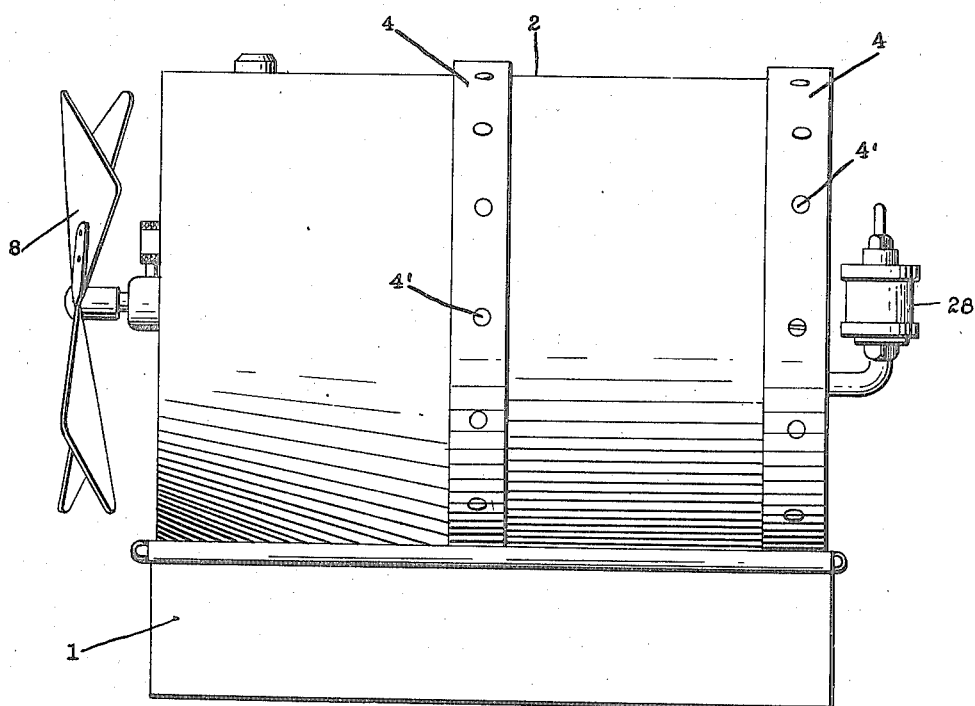

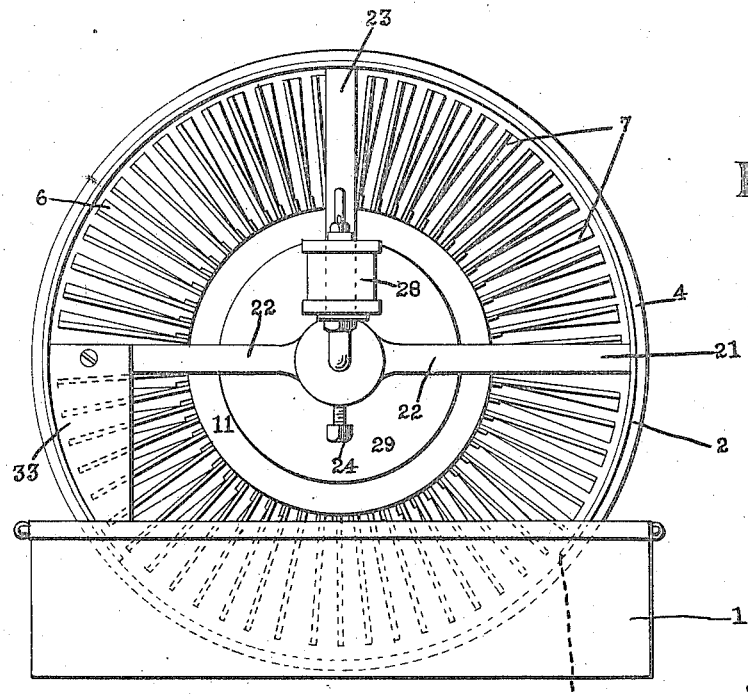
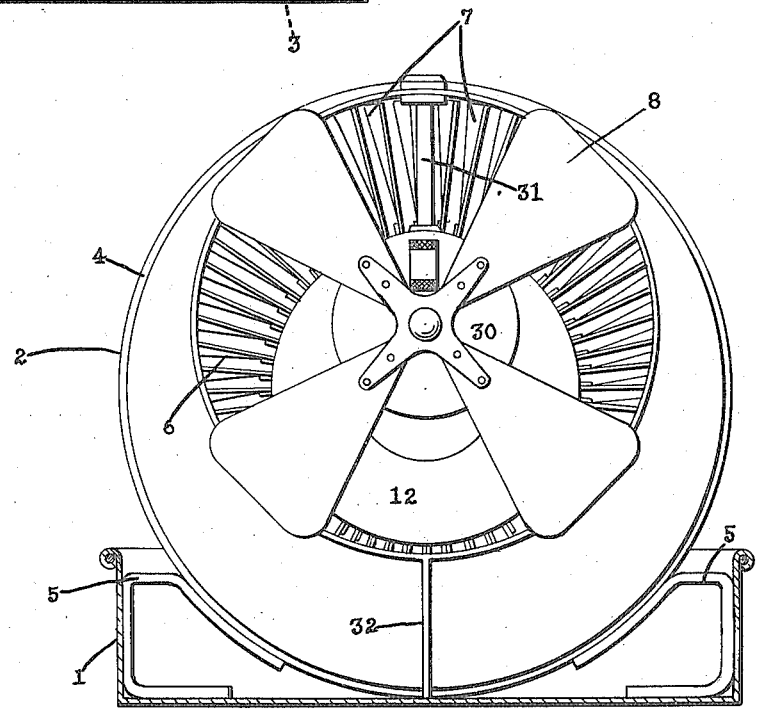

1,248,631.

Patented Dec. 4, 1917.
3 SHEETS—SHEET 3.

WITNESS
Howard P. King

INVENTOR:
Malcolm Dickerson,
BY
Russell M. Everett,
ATTORNEY.

UNITED STATES PATENT OFFICE.

MALCOLM DICKERSON, OF NEWARK, NEW JERSEY, ASSIGNOR TO AMERICAN AIR PURIFIER CORPORATION, A CORPORATION OF NEW YORK.

AIR PURIFIER AND HUMIDIFIER.

1,248,631.  Specification of Letters Patent.  Patented Dec. 4, 1917.

Application filed October 29, 1915. Serial No. 58,537.

*To all whom it may concern:*

Be it known that I, MALCOLM DICKERSON, a citizen of the United States, and a resident of Newark, in the county of Essex and State of New Jersey, have invented certain new and useful Improvements in Air Purifiers and Humidifiers, of which the following is a specification.

The objects of this invention are to employ with a fan for producing a current of air through the device, an improved wheel for presenting water to said air current which wheel shall be driven by the air current; to enable the fan and wheel to be driven at different speeds and to be other than concentric with each other, whereby the fan may discharge more effectively against the vanes of the wheel; to provide the wheel with vanes providing an extensive surface for water and at the same time arranged and adapted to receive the current of air most effectively; for this purpose to curve the vanes transversely or out of the plane of the axis of the wheel; to employ in connection with the wheel a supply from which water will be taken by the wheel and presented to the current of air as a film upon the vanes of the wheel; to provide a compact and neat-appearing casing for inclosing the wheel and receiving the current of air; to locate the fan motor within said casing and the fan itself closely adjacent the inlet end thereof; to employ a fan of larger diameter than the inlet end of the casing and thus insure less noise; to submerge the vanes of the wheel deeply in the water, and at the same time prevent the water from being blown out of the pan by the air current; to secure a strong and simple construction of the wheel, and to secure other advantages and results as may be brought out in the following description.

Referring to the accompanying drawings, in which like numerals of reference indicate the same parts throughout the several views, Figure 1 is a plan of a humidifier embodying my invention;

Fig. 2 is a side elevation of the same;

Figs. 3 and 4 are views from opposite ends of the humidifier, the pan being broken away in Fig. 4;

Figure 5:
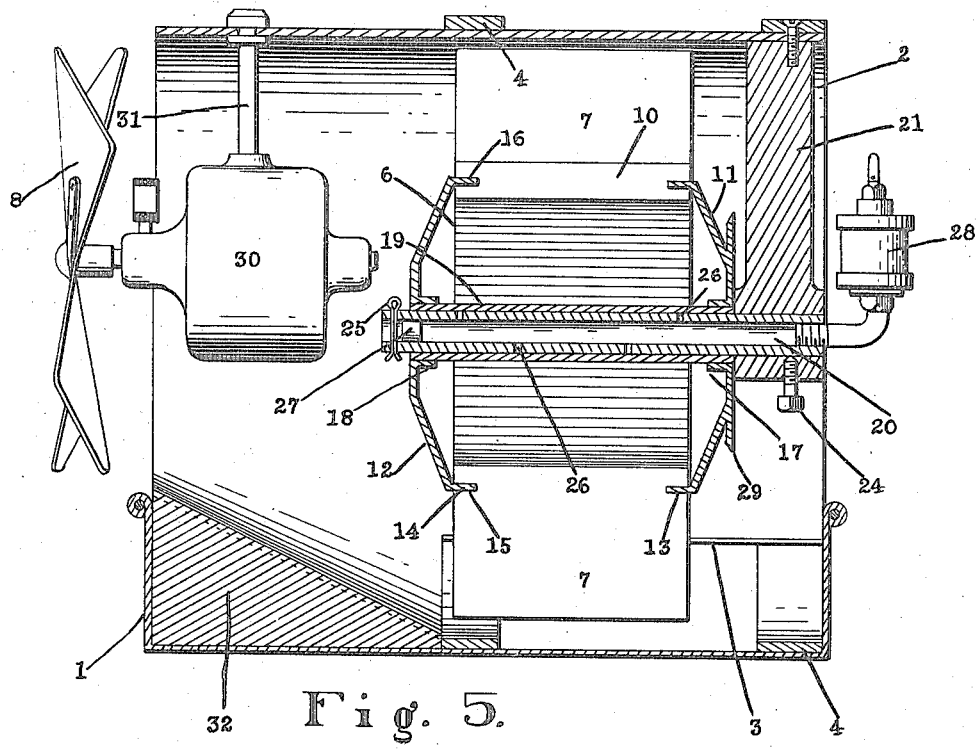
Fig. 5 is a central longitudinal section on line A—A of Fig. 1.
Figure 7:
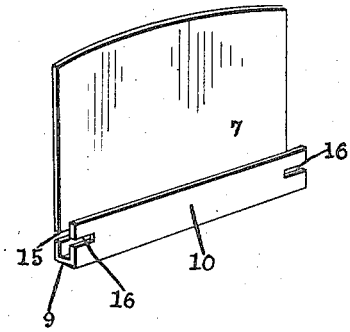
Fig. 7 is a perspective view of one of said vanes.
Figure 6:
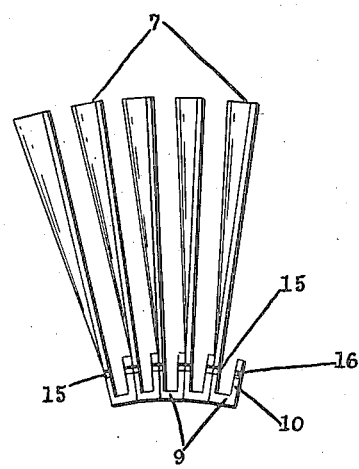
Fig. 6 is a detail view of a plurality of the vanes, looking at their side edges.

In the specific embodiment of the invention illustrated in said drawings the reference numeral 1 indicates a pan of sufficient depth to hold a quantity of water, and into which a stationary casing 2 may be stood. This pan and casing may be made of any size or proportion desired, but for illustrative purposes the pan is shown as substantially square and the casing of a length and width to fit nicely within the same. Preferably the upper part of the casing at one end of itself is cylindrical and at the other end the casing is tapered with its larger end of the same size as the cylindrical portion of the casing and joining therewith. The wall of the cylindrical portion of the casing terminates below the top edge of the pan so that there is a cut away portion 3 opening downward into the pan. Extending around the cylindrical portion of the casing at its opposite ends is a pair of rings 4, 4 to which the casing is secured as by rivets 4' for support. Suitable feet 5 are secured at separated points of the rings to hold the same in upright position, said feet preferably engaging the side walls of the pan as well as the bottom thereof to retain the casing in proper position.

Supported within the cylindrical portion of the stationary casing, and preferably axially coincident therewith, is a water wheel 6 having vanes 7 around its periphery, the lower ones being within the pan so that as the wheel is rotated the vanes will pass successively through water in the pan. Preferably the water wheel 6 is mounted to rotate freely, and is not connected up with any source of power, its rotation being obtained by passage of air through its vanes from a fan 8 positioned just outside the open end of the tapered portion of the casing, and preferably axially coincident therewith. It is to be noted that the top of the tapered portion of the casing is in substantial alinement with the top of the cylindrical portion (see Fig. 5) and that there is a very decided taper of the casing at its bottom portion so that the fan when placed concentric with the opening of the tapered end is eccentric with respect to the water wheel, and above the same. In this way the greater part of the air which is driven through the water wheel by the fan passes through the upper portion of the water wheel. It is to be understood that as the water wheel rotates it carries a quantity of water with it, preferably in a film, and the fan creates a draft of air which passes through the water wheel vaporizing the water contained thereon and carrying the humidified air thus obtained out at the opposite end of the casing.

In order to construct the vanes of metal and at the same time cause the water to form in a film thereon, it is necessary to treat the vanes in some manner to prevent the water from drawing together in drops. To this end the vanes are coated with caustic potash which overcomes the surface tension of the water so that it adheres to the vanes in a thin film. Obviously other substances or means may be employed for this purpose, and although caustic potash has been found to work successfully I do not wish to be understood as limiting myself exclusively thereto.

It is desirable in practice to provide as great a surface within a limited space as possible from which to vaporize the water, and to this end the vanes are placed as close together as can be done without possibility of the water spanning between the vanes and being blown out into the room in drops. In constructing the vanes, the same are preferably formed of sheet metal, each having a marginal portion of its inner edge, or edge toward the center of the wheel, bent substantially at right angles, as at 9, and then bent again substantially at right angles back upon itself as at 10, the portion 10 or lip last bent being spaced from the body of the vane by the first bent portion or offset 9. The next adjacent vane engages the lip 9 and provides itself a similar lip against which the next vane engages, and so on around the entire water wheel. The offset 9 may be increased or decreased as found desirable to vary the number of vanes and the distance which the same are separated. For holding the vanes in proper position heads 11, 12, are provided at opposite ends of the vanes. These heads are circular and provide at their outer peripheries inturned annular flanges 13, 14 adapted to take into slots 15 in the edges of the vanes preferably near the inner ends of the same. As shown in the drawings, the slots are in the vanes adjacent the offsets 9 so as to have slots 16 in the lips 10 of the vanes also, so that each vane is supported upon the heads by the flanges thereof passing through both the body portion and the lip, which accordingly holds the vanes independently against tilting so that when they are all assembled a rigid construction is obtained.

A hole is provided at the center of each of the heads 11, 12 and inturned flanges 17, 18 are provided around the same and are made fast to a tube 19 as by soldering, and through this tube extends a stationary axle 20. Said axle is carried in a spider frame 21 mounted at the open end of the cylindrical portion of the casing, the spider frame in the present disclosure providing oppositely extending or horizontal arms 22 and an upright or vertical arm 23 all of which extend to the casing and are supported by the ring 4. A set screw 24 extends upwardly through the bottom of the spider frame engaging the axle 20 to secure the same fast to the frame. The head 11 adjacent the spider frame is adapted to engage the same and prevent longitudinal movement upon the axle, and a cotter pin 25 or other suitable means are provided at the opposite end of the axle to engage the head and prevent the water wheel from becoming displaced.

Any means of lubrication may be employed which is found desirable, but for illustrative purposes I have shown the axle 20 hollow and providing a plurality of radial holes 26 which will permit lubricant to pass from the inside of the axle to the outside between the same and the tube 19. The end of the axle away from the supporting spider frame is closed, as by a plug 27, and the other end is in communication with lubricating means such as the oil cup 28 as shown. In order to prevent the water from getting into the bearing, the head 11 is provided with a flange 29 which will catch the water and cause the same to fall from its outer edge without passing to the bearing. This flange is shown as a disk in the same plane with the center portion of the head 11 and from which the head slopes away toward the opposite end of the water wheel, providing a sharp angle between the flange and sloping portion of the head. In operation, it is only necessary to have a flange for catching the water at the end of the water wheel away from the fan since the fan blows the water in that direction and it is toward that end to which the water will consequently run. Obviously, also, water will be elevated only when the fan is operating since it is the operation of the fan which rotates the water wheel.

In order to obtain greatest efficiency of operation, the vanes are preferably bowed or curved transversely or in a direction parallel to the axis of rotation of the wheel, that is to say, the end or radial edges of the vane are in a common plane with the axis of the wheel and with each other whereas the body of the vane bulges out of that plane, this bulge, being greatest at the outer marginal edge of the vane and decreasing inwardly toward the axial center. It is generally understood that a fan of the type disclosed sets up a current of air having a spiral motion, and to obtain greatest efficiency, I prefer to give a curve to the water wheel vanes which will position the marginal end edges of the vanes toward the fan at an angle coincident with the angle of the current of air, that is, so that the air from the fan first engages the vanes of the water wheel tangentially and is changed in its course by the curvature of the water wheel vanes. This avoids an abrupt impact of the air against the water wheel vanes, and accordingly avoids the humming sound which would otherwise occur. Noise is furthermore lessened or avoided in my improved device by properly positioning the fan wheel and proportioning the diameter of the same to the diameter of the adjacent open end of the casing. As shown, (see Fig. 4 especially), the fan wheel is a little larger than the opening for the reason that the air blown by the fan is cone-shaped and at the front of the fan wheel is of a diameter somewhat less than the diameter of the fan wheel, increasing in diameter as it gets farther and farther from the pressure of the fan. It is accordingly desirable to proportion the open end of the casing to just receive this cone of air, and taper the wall of the casing to accommodate the cone of air in its natural degree of expansion, which avoids eddy currents of air and striking of air upon the wall or casing. As may be seen from the drawings, the fan wheel is positioned away from the end of the casing, the distance being such as to allow for the initial contraction of the air as it leaves the fan wheel to where the expansion commences.

For compactness, the fan motor 30 is placed within the casing, and although of course some interference results to the air current, it is not only at the center of the cone where the air velocity is obviously weakest from the very nature of the fan propelling the same, but is also adjacent to the fan so that the air propelled by the outer ends of the fan wheel, and accordingly moving at the highest velocity, has not traveled far enough to deflect inwardly sufficient to encounter the fan motor, so it is the air moving at a lower velocity only which is interfered with thereby. A post 31 is shown depending from the top of the tapered portion of the casing for supporting the motor, and this post is made as slender as practicable to interfere as little as possible with the air.

It may here be noted that a baffle 32 is provided beneath the tapered wall of the casing within the pan, positioned vertically and longitudinally with respect thereto, in order to prevent the air currents from blowing water out of the pan. Furthermore, a stationary shield 33 is positioned at the end of the water wheel away from the fan wheel, to prevent drops of water being blown into the room. Such a shield is shown attached to one cross arm of the spider frame extending from the same down into the pan and adjacent the side of the casing at which the water wheel vanes emerge from the water. It often happens that the current of air is sufficiently strong to blow drops of water off the water wheel at this side before the water has drained properly to leave only a film upon the vanes, and the shield 33 catches the same and returns it into the pan. In this connection it may be well to note that the pan and casing are open in construction, allowing for the ready flow of water from one part of the pan to another, which not only conduces to the more even operation of the water wheel and discharge of uniformly treated air, but permits the pan to be filled nearer to its top without likelihood of spilling it by operating the fan and water wheel.

In operation, the pan is filled to a reasonable extent with water, and the motor is then allowed to rotate the fan wheel which results in a passage of air through the casing. This air engages the vanes of the water wheel, and more especially those vanes at the upper part thereof because of the eccentricity of the fan and water wheel, and due to the direction which the air is traveling and the curvature of the vanes of the water wheel, the passage of the air through the water wheel sets up a rotation of said wheel. The lower vanes of the water wheel being substantially submerged in the water, emerge as the wheel rotates covered with water and drain so as to retain only a film of it upon themselves. The air in passing over the water vaporizes the same and thus as the air passes out from the casing into the room or other place of discharge it is humidified or treated as is desired. Attention is to be directed to the fact that the passage of the air serves a double purpose, namely, to rotate the water wheel and to vaporize the water film. This is advantageous in that the fan may be run at a high speed, and need not be retarded by gearing or otherwise mechanically driving the water wheel therefrom. Ample surface for the water to be vaporized from is provided by the vanes and may obviously be increased if desired by increasing the number of vanes, that is, placing the vanes closer together so more may be added for any given size of water wheel, or the dimensions of the water wheel may be increased. The water wheel as shown provides an extensive surface, and the air current rotates the same so as to present a constantly changing surface with water thereon.

It will be understood that my improved device may be employed for any purpose to which it is adapted and for which it is capable, and that the uses to which it can be put are varied and numerous. One common use is to employ the device as a humidifier or to increase the moisture in air which is too dry, either for purposes of comfort as in offices, hospitals or the like, or for numerous purposes as in the handling of tobacco, feathers and so forth. Another use of the machine is to purify, cleanse or similarly treat air, and still another use is to charge the air with other substances than moisture, as for instance perfume or the like. Other uses of the device will suggest themselves or arise, and I do not wish to be understood as restricting myself in any way in this respect.

Obviously detail modifications and changes may be made in manufacturing my improved air purifiers and humidifiers without departing from the spirit and scope of the invention, and I do not wish to be understood as restricting myself except as required by the following claims when construed in the light of the prior art.

Having thus described the invention, what I claim is:

1. In a device of the character described, a rotary fan for producing a current of air, a wheel eccentric to said fan and having blades by which the current of air will turn the wheel, and means for supplying water to said wheel at the opposite side of its center from that at which the center of the fan lies.

2. In a device of the character described, a fan for producing a current of air, a wheel eccentric to said fan with its center below that of the fan and having blades adapted to be engaged at the upper part of the wheel by said current of air to turn the wheel, and means for supplying water to the blades at the lower part of the wheel.

3. In a device of the character described, a casing open at both ends and having a cylindrical upper part, a motor fan mounted on said upper part of the casing transverse to the passage through the same at one end thereof, a water wheel also mounted on the upper part of the casing transverse to the passage therethrough and having blades by which the current of air from said fan will turn the wheel, and means at the bottom of the casing for retaining water in contact with the blades at the lower part of the water wheel and for supporting said casing so as to form a base for the entire device.

4. In a device of the character described, a tapered casing open at both ends, a fan at the small end of said casing adapted to force air thereinto and through the casing, a water wheel in the casing having blades by which the air will turn the wheel and means for supplying water to the blades at the lower part of said wheel.

5. In a device of the character described, a casing having one end portion cylindrical and the other tapered eccentrically with respect thereto and being open at both ends, a fan at said tapered end of the casing adapted to force air through the casing, a water wheel in the cylindrical portion of the casing having blades by which the air from said fan will turn the wheel, and means for supplying water to the blades at the lower part of said wheel.

6. In a device of the character described, the combination with a pan adapted to contain water, of a casing open at both ends extending upward from said pan, said casing having a tapered end with a longitudinal baffle extending downward therefrom into the pan, a fan outside said tapered end adapted to force air thereinto and through the casing, and a water wheel in said casing extending downward into the pan and upward into the path of a current of air from said fan, said baffle preventing undue agitation of the surface of water in the pan by any portion of the air current which passes beneath the tapered end of the casing.

7. In a device of the character described, the combination of a pan adapted to contain water, a casing extending upward from said pan and open at both ends, a fan at one end of said casing above the pan adapted to force air thereinto and through the casing, a water wheel in the other end of the casing extending into the pan and adapted to be driven by a current of air from said fan, and a shield at the wheel end of the casing for preventing the wheel from throwing water over the edge of the pan.

8. In a device of the character described, the combination with a fan, of a wheel having radial blades extending longitudinally of the axis of the wheel and bowed in that direction.

9. In a device of the character described, the combination with a fan, of a wheel having radial blades extending longitudinally of the axis of the wheel and bowed in that direction so that their ends next the fan are in alinement with the direction of movement of the air as it strikes them.

10. In a device of the character described, a wheel for presenting water in a film to be vaporized comprising a plurality of substantially radial blades having slots at opposite edges, heads at opposite ends of the blades having flanges in said slots for holding the blades, and means for rotatably mounting said heads.

11. In a device of the character described, a wheel for presenting water in a film to be vaporized comprising a plurality of substantially radial blades each having a lip adapted to engage the next adjacent blade whereby the blades are spaced apart, said blade having slots at its opposite edges, heads at opposite ends of the blades having flanges in said slots for holding the blades, and means for rotatably mounting said heads.

12. In a device of the character described, a wheel for presenting water in a film to be vaporized comprising a plurality of substantially radial blades each having a lateral offset adjacent its inner edge for spacing it from the next adjacent blade and having slots at its opposite ends, heads at opposite ends of the blades having flanges in said slots for holding the blades, and means for rotatably mounting said heads.

13. In a device of the character described, a wheel for presenting water in a film to be vaporized comprising a plurality of substantially radial blades each having its inner end bent laterally and substantially returned parallel to itself, the body portion and returned portion of the blade both having slots at their opposite ends, heads at opposite ends of the blades having flanges in said slots in both portions of the blades whereby each blade is held against wabbling independent of the next blade, and means for rotatably mounting said heads.

14. In a device of the character described, a wheel providing opposite heads, blades between said heads extending radially beyond the same and adapted to carry water upon themselves to be vaporized, a bearing for rotatably supporting said wheel, and a flange on the outer side of one of said heads between its center and periphery adapted to catch water running on the head from the blades toward the bearing and discharge the same.

15. In a device of the character described, a casing open at both ends and having one end portion cylindrical, the other end portion being cylindrical at its upper part and tapered at its lower part, whereby the said end portions are eccentric with respect to each other, a fan at said tapered end of the casing adapted to force air through the casing, a water wheel in the cylindrical portion of the casing having blades by which the air from said fan will turn the wheel, and means for supplying water to the blades at the lower part of said wheel.

MALCOLM DICKERSON.